(12) United States Patent
Perkins et al.

(10) Patent No.: US 8,860,640 B2
(45) Date of Patent: Oct. 14, 2014

(54) ZONAL ILLUMINATION FOR HIGH DYNAMIC RANGE PROJECTION

(75) Inventors: Michael Perkins, Kitchener (CA); Simon Guthrie, Kitchener (CA); John Domm, Kitchener (CA)

(73) Assignee: Christie Digital Systems USA, Inc., Cypress, CA (US)

(*) Notice: Subject to any disclaimer, the term of this patent is extended or adjusted under 35 U.S.C. 154(b) by 16 days.

(21) Appl. No.: 13/483,546

(22) Filed: May 30, 2012

(65) Prior Publication Data

US 2013/0321475 A1    Dec. 5, 2013

(51) Int. Cl.
    *G09G 5/10*    (2006.01)
    *G02F 1/01*    (2006.01)

(52) U.S. Cl.
    USPC ............................................ 345/84; 345/204

(58) Field of Classification Search
    USPC ............. 345/84, 204, 690; 359/248, 250, 259
    See application file for complete search history.

(56) References Cited

U.S. PATENT DOCUMENTS

| 7,551,341 B1* | 6/2009 | Ward et al. ..................... 359/259 |
| 8,125,425 B2 | 2/2012 | Whitehead et al. |
| 2005/0024324 A1* | 2/2005 | Tomasi et al. ................. 345/156 |
| 2006/0114420 A1 | 6/2006 | Kim et al. |
| 2007/0132962 A1 | 6/2007 | Kitamura |
| 2010/0220297 A1 | 9/2010 | Conner |

OTHER PUBLICATIONS

Corresponding European Patent Application No. 13163053.5 Search Report dated Aug. 19, 2013.

* cited by examiner

*Primary Examiner* — Andrew Sasinowski
(74) *Attorney, Agent, or Firm* — Perry + Currier Inc.

(57) ABSTRACT

A zonal illumination system for use in a projector, comprising a source of illumination; a first modulation stage for dividing light from the source of illumination into a plurality of zones having respective light intensities based on zonal lighting intensity of an image to be projected; and a second modulation stage for modulating light from the first modulation stage to generate the image to be projected.

11 Claims, 3 Drawing Sheets

ZONAL ILLUMINATION FOR HIGH DYNAMIC RANGE PROJECTION

BACKGROUND OF THE INVENTION

The present invention is directed to digital projection systems, and more particularly to a zonal illumination system for increasing the dynamic range of digital projection systems.

A typical 3 chip color digital projection system consists of a light source, an illumination system, and a color splitting-recombining light engine. The optical function of the light engine is to split uniform illumination light into Red/Green/Blue (RGB) channels, directing each of the three channels onto an imaging device or optical panel such as an LCD (Liquid Crystal Display), DMD (Digital Micromirror Device) or LCoS (Liquid Crystal on Silicone), and then re-combining all three channels into a single illumination light beam that is projected on a screen via a projection lens.

In a LCD projector, polysilicon panels are used, one each for the red, green and blue components of the video signal. As polarized light passes through the panels (combination of polarizer, LCD panel and analyzer), individual pixels can be modulated to control the amount of light that is passed.

In a DMD imaging device, as exemplified by the Digital Light Processing (DLP™) technology of Texas Instruments, microscopic mirrors are used to electromechanically modulate light by independently flipping each mirror through a +−12 degree angle.

LCoS is a reflective technology similar to LCD except that a controlled amount of light reflects off of the front surface of the device instead of being transmitted through it.

The dynamic range of the image projected by a digital projection system is limited by the capabilities of the chosen imager. This applies equally to DLP, LCOS, LCD, as well as any other technology. In DLP™ systems, the dynamic range of a projected image is limited by the switching speed of the DMD. Grey scale aspects of the image are created using pulse width modulation (PWM) techniques. Thus, for a DMD device full white is achieved by leaving the mirrors in the on state for the duration of the frame period, full black is achieved by leaving the mirrors in the off state for the frame period, while minimal grey is achieved by having the mirrors in the on state for the shortest period of time that can be supported by the DMD (known as the "Load Time"). For the current generation of DLP™ technology this limits the dynamic range to ~12 real bits on a 4 K DMD (assuming 24 Hz frame rate—higher rates have correspondingly fewer bits). This also assumes the minimal grey is visible against the native contrast ratio of the system. In LCOS and LCD the digital data is converted to an analog signal by a DAC (digital to analog converter). In this category of projector the dynamic range is limited by the bit depth and signal to noise ratio of the DAC.

A typical one-chip color digital projection system replaces the three imaging devices with a single imager. The light source is then modulated so that only one color of light is available at any given moment in time. This may be done in lamp based projection using a color wheel. In systems using solid state illumination (e.g. LEDs, Lasers) this may be accomplished by turning the individual colors on and off in synchronization with the content displayed on the imager. In one-chip projectors the color separating/combining prism is no longer required.

It is desirable, in digital projection systems for cinema, simulation, and other applications, to have a large dynamic range in order to create a more immersive experience.

It is therefore an objective of the present invention to increase the dynamic range of digital projection systems utilizing imaging devices such as an LCD, DMD or LCoS.

SUMMARY OF THE INVENTION

According to an aspect of the present invention, a two-stage zonal illumination system is provided for increasing the dynamic range of a digital projection system. The image to be displayed is first divided into a plurality of zones of arbitrary size and shape. A first stage of the illumination system ensures that each zone is illuminated with only as much light as is needed to display the portion of the image defined by that zone. The second stage generates the actual image. Zones that have bright content receive maximum light while darker portions receive minimal light. This allows details in dark portions of the image to coexist with very bright content elsewhere, providing a greatly enhanced dynamic range across the entire image.

These together with other aspects and advantages that will be subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
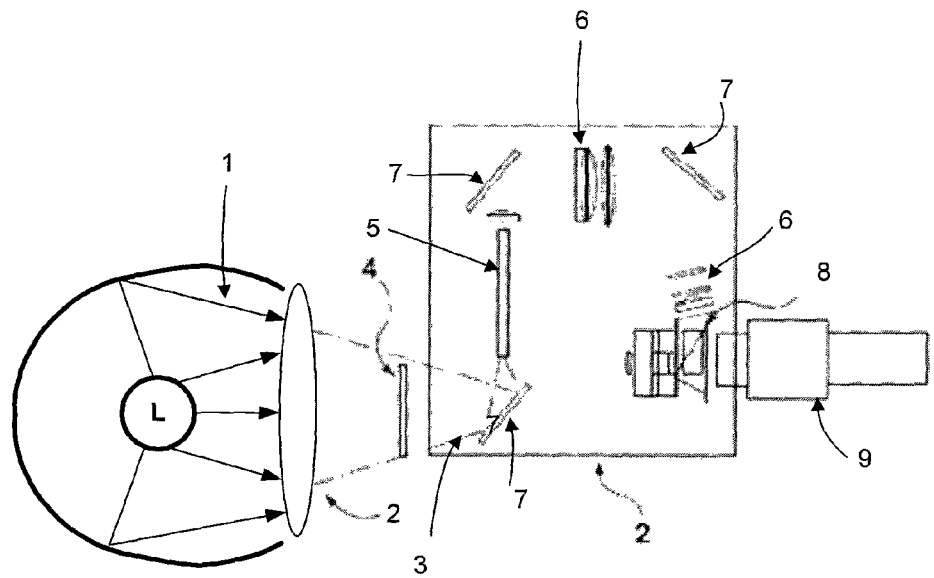
FIG. 1 is a digital projector, according to the prior art.

FIG. 1 shows a typical projector comprising a light source 1 and collection optics 2 (e.g. a Xenon lamp and parabolic reflector) for creating a light cone 3 that passes through a UV filter 4 into an illumination system 2, including an integrator rod 5, relay lenses 6, mirrors 7, and a light engine 8 for projecting the final image via projection lens 9. In FIG. 1, the light source 1 is indicated as being a Xenon lamp and parabolic reflector, although a person of skill in the art will understand that a solid state light source may be used, such as laser light projected via a fiber optic bundle.

Figure 2:
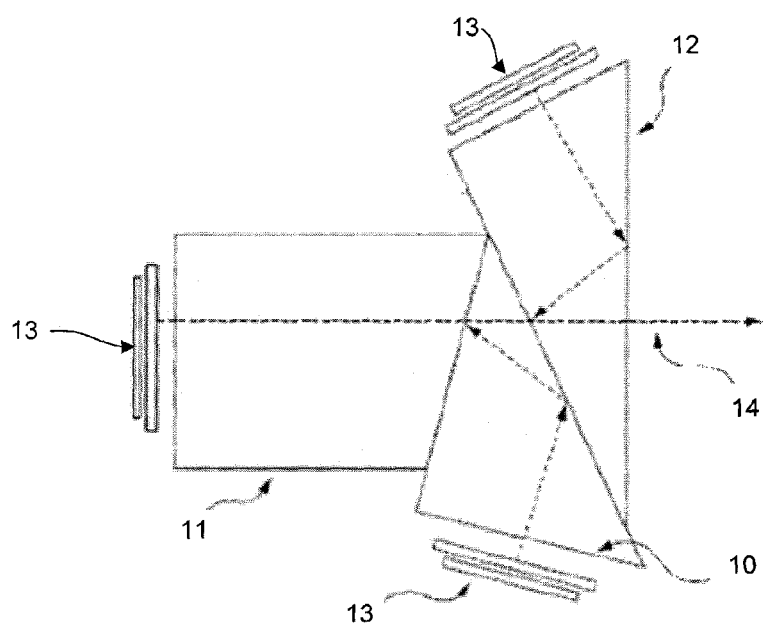
FIG. 2 is a schematic representation of a light engine with a color separating/combining prism and DMD, according to the prior art.

As shown in FIG. 2, the light engine 8 includes a color splitting/combining prism with three prism elements and respective red channel 10, green channel 11 and blue channel sub-assemblies 12, each of which includes an imaging device 13. The prism elements contain dichroic coatings to separate the incoming white light into blue, green, and red. Each color is then separately modulated at each imaging device 13, such as a DMD, using pulse width modulation (PWM). The light modulated by imaging devices 13 is re-converged (14) by the prism and projected by projection lens 9 onto a screen to produce an image.

Optical integrator rod 5 functions as an internally reflective "light pipe" that causes multiple internal reflections of the incoming light to obtain homogenization of round or irregular patterns of illumination and convert them into a uniform rectangular pattern. Thus, the optical integrator rod is used to improve uniformity and efficiently match the aspect ratio of the illumination source to the imaging devices 13.

Figure 3:
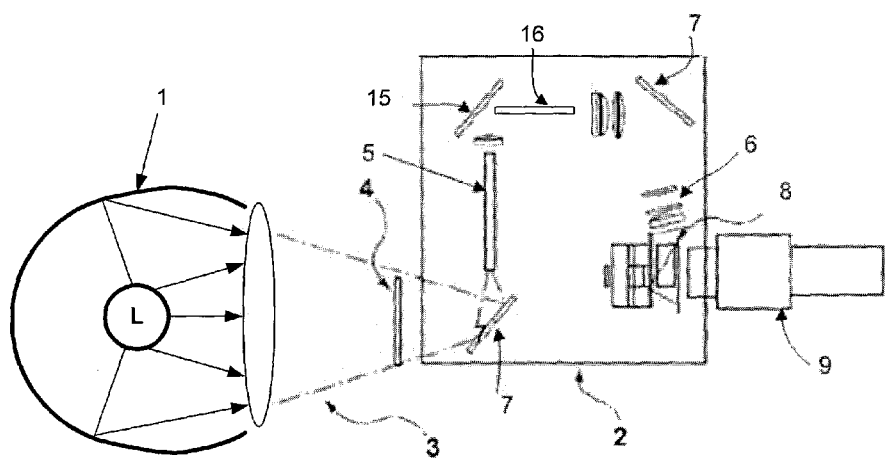
FIG. 3 is a schematic representation of a zonal illumination system according to an embodiment of the present invention.

Turning to FIG. 3, a modified projector is shown with two stages of modulation, according to the present invention. In the first stage of modulation, the image is divided into a plurality of zones. Each zone is assigned a brightness level based on the image to be projected. Bright portions of the image are set to a high intensity and dark portions of the image are set to a low intensity. The second stage of modulation comprises light engine 8, which operates as discussed above.

According to the illustrated embodiment, the mirror at the output of integrator rod 5 is replaced by a zonal imaging device 15 for modulating the light according to a spatially variable pattern (first spatial light modulator) and applying the modulated light to a further integrating rod array 16 which, in turn, projects the spatially variable pattern of light onto the imaging devices 13 in light engine 8 for generating the final image (spatial light modulator).

By using two stages of spatial light modulation, the dynamic range of the system for a given scene becomes the product of the dynamic range of the two imaging devices 13 and 15, which is much higher than can be achieved by a single device. Also, the local contrast ratio is greatly enhanced since if only one section of each imaging device 13 needs to be illuminated by high intensity light, the rest of the imaging device can be illuminated at a very low level, or not at all, such that black portions of the image become much darker than achievable with traditional projectors.

Although two stage modulation can be accomplished by generating a grey scale pattern on the first imaging device 15 and projecting that onto the imaging devices 13 in light engine 8, problems can arise as a result of beat frequencies being created by the PWM sequences applied to both sets of imaging devices. Given the highly complex nature of the PWM sequences, control of the actual intensities and avoidance of image artifacts can be difficult.

Figure 4:
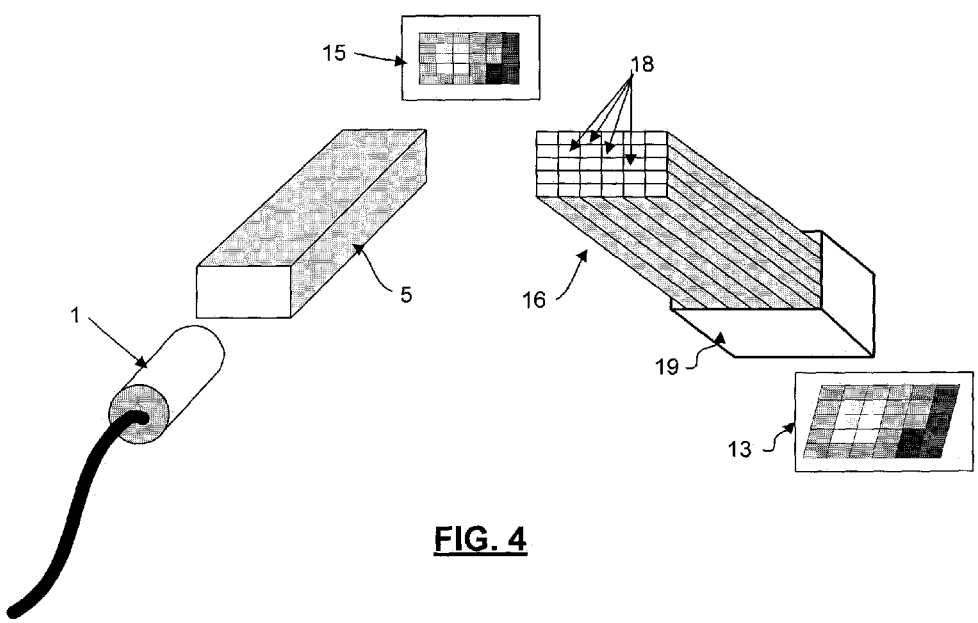
FIG. 4 is a schematic representation of a zonal illumination system according to a preferred embodiment.

Therefore, according to the preferred embodiment, spatial dithering patterns are generated by the zonal imaging device 15 and, rather than being of solid unitary construction, integrator rod 16 is configured as an array of solid core integrating rods 18, as shown in FIG. 4. The number of rods 18 corresponds to the number of zones (e.g. 19×10=190 zones, although other array dimensions and numbers of zones are contemplated). The integrating rods 18 are preferably rectangular in cross section and are combined to form an array. A further hollow integrating rod 19 is preferably provided at the output of the array in order to blur the seams between individual rods 18.

Figure 5:
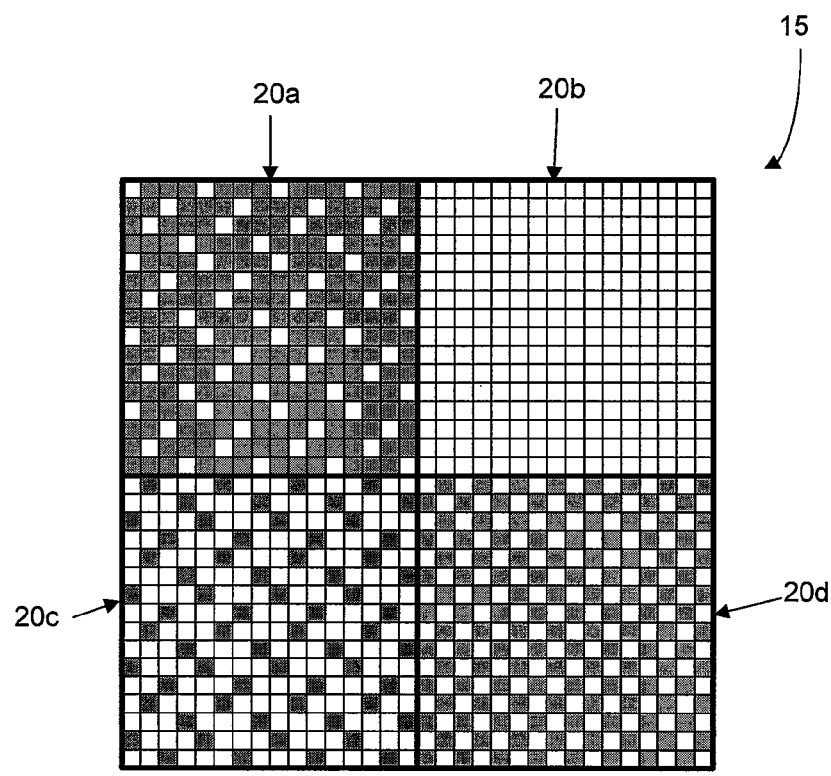
FIG. 5 is a schematic representation of a plurality of spatially variable (dithering) patterns for application to a zonal imaging device, according to the embodiment of FIG. 4.

As shown in FIG. 5, spatial dithering patterns are used to control zonal intensity, wherein the individual mirrors of zonal imaging device 15 are held static (i.e. on or off) for the duration of each video frame. This eliminates any temporal artifacts that would otherwise be created as a result of generating a grey scale pattern. As discussed above, the number of rods 18 corresponds to the number of zones. For ease of illustration, FIG. 5 depicts an array of only four zones 20a-20d. Upon projecting the dithering patterns from respective zones 20a-20d onto corresponding rods 18, the spatial pattern of each zone becomes averaged and converted into an intensity that is directly proportional to the density of each dithering pattern. Thus, for the example of FIG. 5, zone 20b has the highest intensity, followed by 20c, 20d and 20a.

Since dynamic range depends on the number of pixels projected into a given rod 18, in a cinema application where the zonal imaging device 15 is a 2 K DMD with 2048×1080=~2 million pixels, then for 100 zones in total, there are over 20,000 pixels per zone. In principle this multiplies the dynamic range by up to 20 k. In practice if only one, or a small number of the 20 K pixels is required to light up the zone it is likely that the light will not be evenly distributed. By setting a minimum brightness level it will still be possible to achieve an increase in dynamic range by several orders of magnitude while maintaining uniformity.

In terms of implementation, although the registration of the first imaging device 15 to the integrating rod array 16 is important, small offset errors are not likely to result in a large cumulative error since the offset error will be averaged out by integration. However, registration of the output of the integrating rod array 16 to the primary imaging devices 13 is critical. As shown in FIG. 4, the output of integrating rod 16 is incident on primary imaging device 13 at an angle (e.g. thereby inducing a keystone effect such that the square zones of the zonal imaging device 15 become converted to parallelograms on the primary imaging devices 13. A person of skill in the art will understand that this can be compensated for using well known keystone correction techniques.

The sharpness of the transition between zones on the primary imager 13 will depend on the quality of the focus of the image from the integrating rod array 16 on the primary imager 13. Due to Scheimpflug distortion (i.e. the image plane of the optical system is tilted relative to the surface being projected onto), the quality of this focus will vary across the surface of primary imager 13, but can be accommodated for by optical adjustment (Scheimpflug correction) or by image processing algorithms.

Finally, the black levels across zones need to be compensated for. For example, zone 20a in FIG. 5 is characterized by a small number of high intensity pixels on a black background. If the neighboring zone 20b were all black (rather than all white, as illustrated), the black levels will be mismatched. Therefore, an offset is applied to the neighboring zone 20b in order to compensate for the mismatch. This compensation should preferably be designed to roll off and decrease to zero so that zones that are further away are not unnecessarily affected by the brightness requirements of one particular zone.

The many features and advantages of the invention are apparent from the detailed specification and, thus, it is intended by the appended claims to cover all such features and advantages. For example, although the exemplary embodiment relates to a convergence mechanism for DMDs, the principles set forth herein apply equally to LCD and LCoS, and other similar technologies. Also, the integrator rods 5 and 16 may be replaced by Fly's Eye integrators.

Further, numerous modifications and changes will readily occur to those skilled in the art. For example, as an alternative to using a single light channel from a source of white light (e.g. the Xenon lamp 1) and a color splitting-combining prism for separating the white light into blue, green, and red prior to modulation and then combining the modulated coloured light, it is contemplated that three separate colour channels may be provided, each with a coloured light source (e.g. red, blue and green lasers) and respective integrators and modulators. It is not desired to limit the invention to the exact construction and operation illustrated and described, and accordingly all suitable modifications and equivalents may be resorted to, falling within the scope of the claims.

What is claimed is:

1. A zonal illumination system for use in a projector, comprising:
   a source of illumination;

a first spatial light modulator for dividing light from said source of illumination into a plurality of zones having respective light intensities based on zonal lighting intensity of an image to be projected; and a second spatial light modulator for modulating light from said first spatial light modulator to generate said image to be projected, wherein said first spatial light modulator comprises a first integrator for internally reflecting light from said source of illumination, and a first imaging device for receiving light from said first integrator and in response generating a spatially variable pattern of light wherein each zone has a brightness intensity corresponding to the brightness of an associated portion of the image to be projected, wherein said second spatial light modulator comprises a second integrator for internally reflecting said spatially variable pattern of light from said first spatial light modulator, and a second imaging device for receiving and modulating said spatially variable pattern of light from said second integrator to generate said image to be projected, wherein said first imaging device generates a respective spatial dithering pattern for each said zone, and wherein said second integrator comprises an array of integrating rods for receiving said spatially variable pattern of light such that each integrating rod in said array receives the respective spatial dithering pattern from a corresponding one of said zones.

2. The zonal illumination system of claim 1, wherein said first imaging device generates a greyscale light pattern for projection onto the second spatial light modulator.

3. The zonal illumination system of claim 1, wherein said first imaging device generates a greyscale light pattern for projection onto the second spatial light modulator, for a single colour channel.

4. The zonal illumination system of claim 3, comprising three sets of imaging devices and spatial light modulators, for three respective colour channels.

5. The zonal illumination system of claim 1, wherein said first imaging device generates a respective spatial dithering pattern for each said zone, for a single colour channel.

6. The zonal illumination system of claim 5, comprising three sets of imaging devices and spatial light modulators for three respective colour channels.

7. The zonal illumination system of claim 1, further comprising an additional integrator at the output of said second integrator for blurring seams between individual integrating rods in said array.

8. The zonal illumination system of claim 1, wherein each of said first imaging device and second imaging device comprises one of either a digital micromirror device, liquid crystal device, or liquid crystal on silicone device.

9. A method of zonal illumination for use in a projector, comprising:

dividing light from a source of illumination into a plurality of zones having respective light intensities based on zonal lighting intensity of an image to be projected;

modulating the plurality of zones of light to generate said image to be projected, wherein the brightness of each of said zones is set to an intensity corresponding to the brightness of an associated portion of the image to be projected, wherein each of said zones corresponds to a respective spatial dithering pattern, wherein each said respective spatial dithering pattern is held static for the duration of each frame of said image, wherein each said respective spatial dithering pattern is integrated to an intensity that is directly proportional to the density of said respective spatial dithering pattern; and compensating for mismatch between black levels across said plurality of zones, wherein said compensating rolls off and decreases to zero so that widely separated zones are less affected by brightness requirements of a particular zone.

10. The method of claim 9, further comprising calibrating said plurality of zones of light prior to modulation.

11. The method of claim 9, further comprising one of either optical or image processing compensation for Scheimpflug.

* * * * *